United States Patent [19]

Little

[11] Patent Number: 4,675,228

[45] Date of Patent: Jun. 23, 1987

[54] CPE-PVF LAMINATE FOR CHEMICAL PROTECTIVE CLOTHING

[75] Inventor: Donald E. Little, Metairie, La.

[73] Assignee: Pacific Textiles, Inc., Metairie, La.

[21] Appl. No.: 850,491

[22] Filed: Apr. 11, 1986

[51] Int. Cl.[4] .............................................. B32B 7/02
[52] U.S. Cl. .................................. 428/215; 428/296; 428/421; 428/422
[58] Field of Search ................ 428/296, 421, 422, 215

[56] References Cited

U.S. PATENT DOCUMENTS 4,518,650 5/1985 Grot et al. .......................... 428/421

Primary Examiner—James J. Bell
Attorney, Agent, or Firm—Freilich, Hornbaker, Rosen & Fernandez

[57] ABSTRACT

Material for chemical protective clothing that is both flexible and capable of withstanding attacks by a wide range of chemicals as well as solvents utilizes a thin film (less than 2 mil) of PVF laminated with a thick sheet (5 to 20 mil) of CPE on one or both sides of the PVF. The PVF provides added protection for chemicals and protects against solvents not protected against by CPE.

2 Claims, 1 Drawing Figure

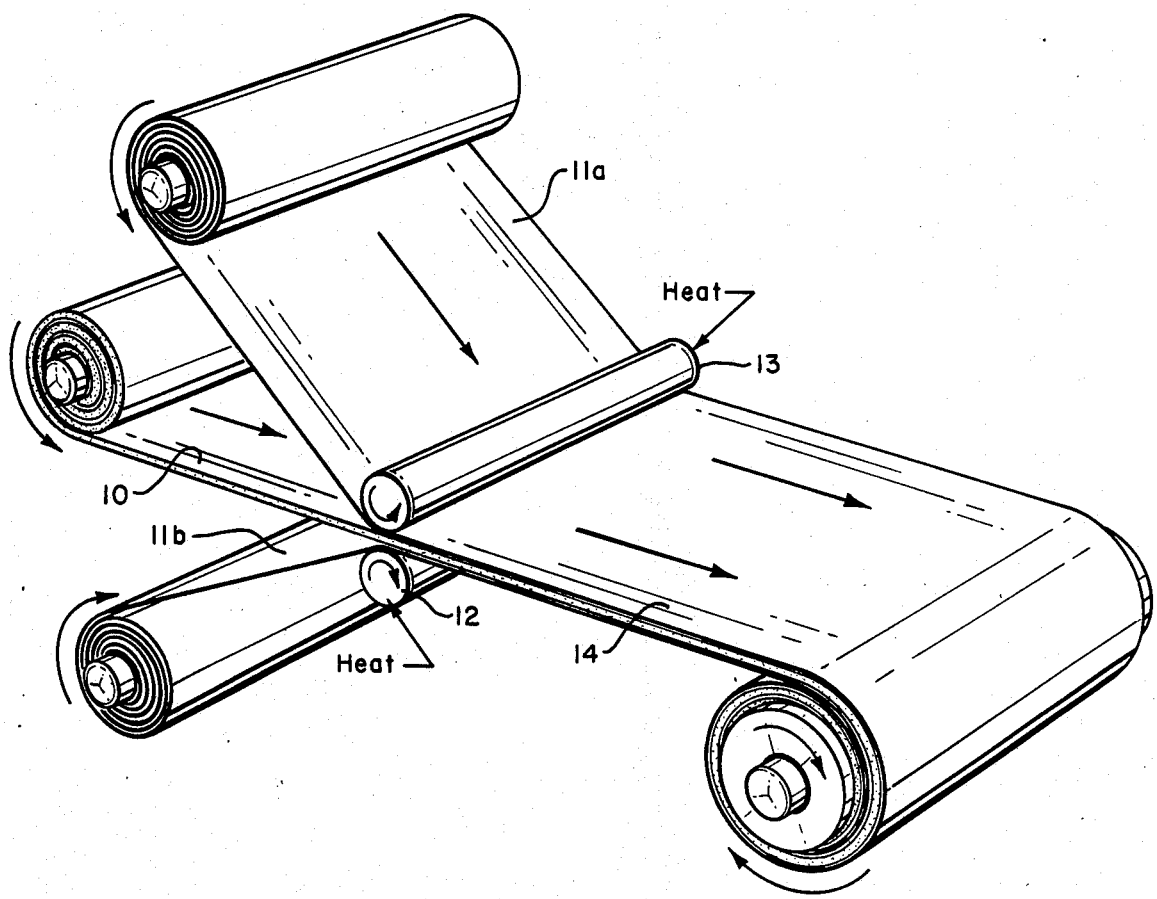

CPE-PVF LAMINATE FOR CHEMICAL PROTECTIVE CLOTHING

BACKGROUND OF THE INVENTION

This invention relates to chemical protective clothing, and more particularly to a material that has a good resistance to a broad range of chemicals for use in chemical protective clothing.

There is a growing need in industry for chemical protective clothing with a broad range of chemical resistance. Chlorinated polyethylene (CPE) polymers produced by Dow Chemical Company is produced in sheets for use in making protective clothing, but it is not recommended for protection against many chemicals, such as chlorinated solvents. There are, of course, other materials that could be used, such as Viton, a trademark of E. I. Dupont De Nemours & Company for a fluoroelastomer based on the capalymer of vinylidene fluoride and hexafluoropropylene, and nitrite-butadiene rubber (NBR). However, these other materials also have their limitations.

A search for a material having good resistance to many chemicals that attack CPE led to Tedlar, a trademark of E. I. Dupont De Nemours & Company for a polymer of vinyl fluoride (PVF). In sheet form, it is characterized by superior resistance to weather, high strength, high dielectric constant, and low permeability to air and water, as well as oil and many classes of common solvents, including hydrocarbons and chlorinated solvents, and only partially soluble in a few highly polar solvents at temperatures above 300° F. Its use has been as a laminate for protection of outdoor material, packaging and electrical insulation. Because the sheet material becomes too stiff as thickness is increased, it has not been used for clothing.

SUMMARY OF THE INVENTION

It has been discovered that a thin film of PVF (thin enough to be flexible for use in clothing, about one to two mils thick) may be laminated on both sides with a sheet of CPE thick enough for use in manufacturing clothing (about 5 to 20 mils thick). The CPE-PVF-CPE material has a broad range of resistance to chemicals, and retains the flexibility of CPE for protective clothing. The thin PVF in the center is protected against punctures or tears while the clothing is in use by the thick CPE so that the integrity of the protection against chemical attack that the PVF provides may be assured.

BRIEF DESCRIPTION OF THE DRAWINGS

The sole FIGURE illustrates the present invention being produced by thermal fusion.

DESCRIPTION OF PREFERRED EMBODIMENTS

Laminaltion may be achieved with adhesives, such as a Tedlar acrylic adhesive system 68070+ catalyst Epon 828 available from E. I. Dupont De Nemours & Company, using a heated platen (about 250° F.). Lamination may also be achieved by thermal fusion using heated rollers at a higher temperature (about 350° to 450°), as shown in the drawing. As the CPE sheet 10 and PVF films 11a and 11b pass between the heated rollers 12 and 13, they quickly fuse under the pressure of the rollers. Once cooled, as the fused CPE-PVF-CPE leaves the rollers, the material 14 has all of the characteristics of CPE with the added chemical protection of PVF. The flexible characteristic of the laminated material is very important for use in protective clothing, not only to give the wearer freedom of movement, but for extended wear without puncturing, splitting, or cracking. In that manner the basic CPE material on both sides of the PVF is modified for an extended range of chemical protection without sacrifice of the desired qualities of CPE.

The protection best afforded by PVF that is not provided by CPE is against solvents, such as n-heptane, ethyl acetate and ethyl alcohol, methyl ethyl ketone, toluene and trichloroethylene. In circumstances where such solvents may be encountered, the integrity of protective clothing made of CPE material alone would not be assured. If an acid is then encountered, such as acetic, hydrochloric, nitric, perchloric, phosphoric or sulfuric acid, the protective clothing may leak and cause the wearer to suffer an acid burn. A similar situation obtains as to bases, such as ammonium and sodium hydroxide, sodium sulfide, phenol, and other irritants to skin.

Although particular embodiments of the invention have been described and illustrated herein, it is recognized that modifications and variations may readily occur to those skilled in the art, such as omitting one layer of CPE for situations where hazards of puncture or tear from the inside of the clothing during use is nil, although even then a layer of CPE should be provided on the inside of the clothing for protection against tears and cracks in the handling of the clothing. Consequently, it is intended that the claims be interpreted to cover such modifications and variations.

What is claimed is:

1. Material for chemical protective clothing comprised of a film of PVF less than 2 mils thick laminated with a sheet of CPE 5 to 20 mils thick to be used in manufacturing clothing.

2. Material as defined in claim 1 where said film of PVF is 1 mil thick and said sheet of CPE is about 10 mils thick.

* * * * *